Jan. 10, 1950  J. R. SABBIA  2,494,005
PILOT'S QUICK DISCONNECT OF SUPPLY LINES
Filed Sept. 4, 1947  4 Sheets-Sheet 2

INVENTOR.
JeromeRSabbia
BY M. B. Tasker
ATTORNEY

Jan. 10, 1950  J. R. SABBIA  2,494,005
PILOT'S QUICK DISCONNECT OF SUPPLY LINES
Filed Sept. 4, 1947  4 Sheets-Sheet 3

INVENTOR.
Jerome R. Sabbia
BY M. B. Tasker
ATTORNEY

Jan. 10, 1950      J. R. SABBIA      2,494,005
PILOT'S QUICK DISCONNECT OF SUPPLY LINES
Filed Sept. 4, 1947      4 Sheets-Sheet 4
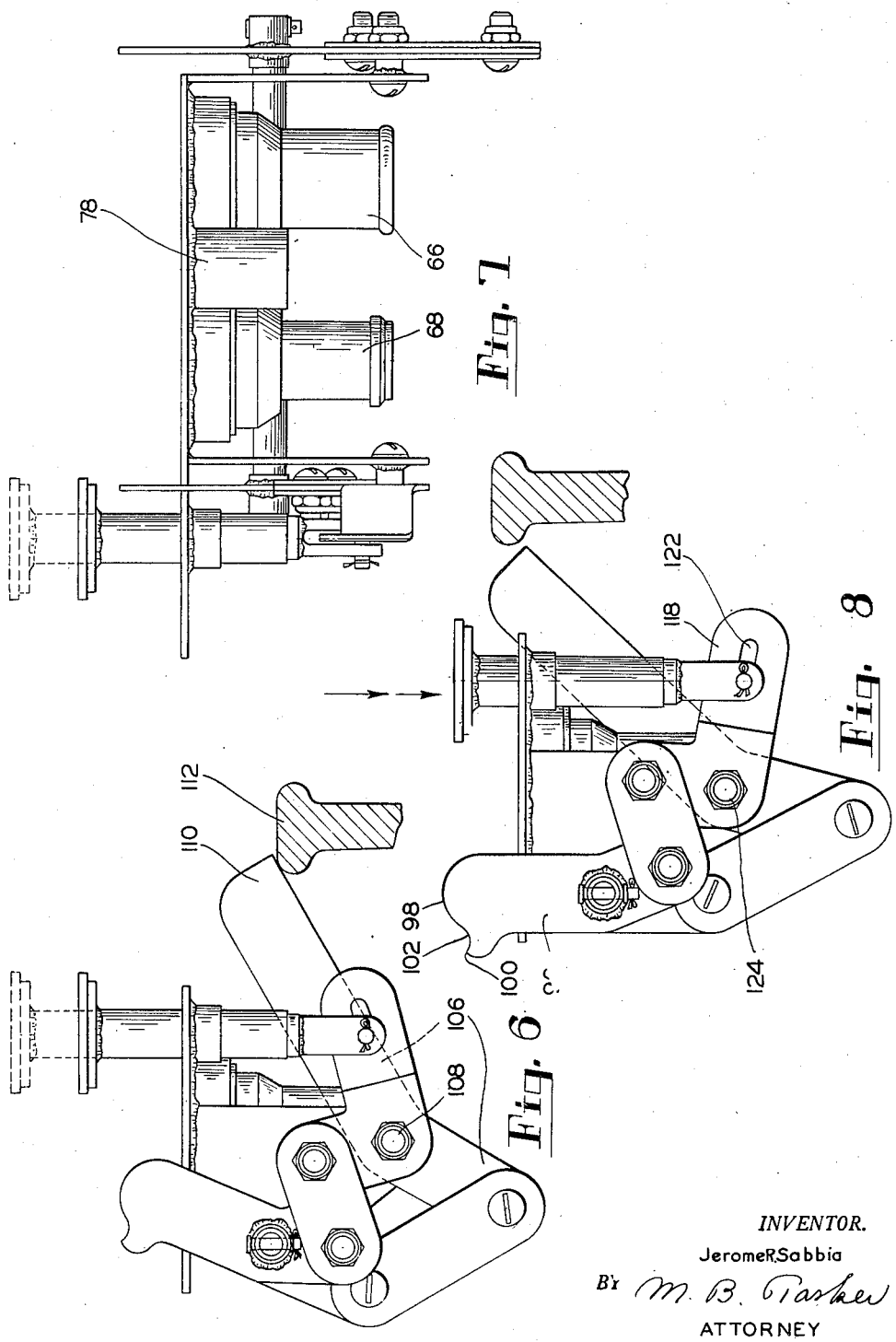
INVENTOR.
Jerome R. Sabbia
BY M. B. Tasker
ATTORNEY Patented Jan. 10, 1950

2,494,005

UNITED STATES PATENT OFFICE 2,494,005

PILOT'S QUICK DISCONNECT OF SUPPLY LINES

Jerome R. Sabbia, Bridgeport, Conn., assignor to United Aircraft Corporation, East Hartford, Conn., a corporation of Delaware Application September 4, 1947, Serial No. 772,199

6 Claims. (Cl. 244—122)

1

This invention relates to high speed aircraft and is particularly concerned with means for enabling the pilot, or passengers, to safely leave the aircraft while the latter is in high speed flight.

In aircraft which are adapted to fly at high speeds and very high altitude, as for example fighter planes, the pilot wears a "G" suit which must be supplied through a hose with air under pressure from a suitable source in the airplane. Oxygen must also be supplied through another hose to the pilot's mask, and various electrical connections must be established to the heating coils in the pilot's suit, to his microphone and to his headset. In bailing out, the various connections to this pilot's fixed equipment must be disconnected in order to permit the pilot to leave the aircraft with safety. Further, the pilot must be protected against the very high air velocities which he will encounter upon leaving the aircraft as he rapidly descends to a level at which he will receive sufficient oxygen to maintain consciousness.

In order to successfully bail out at the high speeds contemplated, the pilot must be forcefully ejected from the aircraft. One of the objects of the present invention is to provide means for automatically disconnecting the pilot's fixed equipment from the aircraft as he is ejected from the craft.

Another object of the invention is to provide improved quick disconnect mechanism for releasably connecting the pilot's fixed equipment with the supply lines carried by the aircraft.

A further object of the invention is generally to improve the construction and operation of quick disconnecting mechanism of this type.

These and other objects and advantages of the invention will become apparent in connection with the detailed description of one form of the invention described herein and shown in the accompanying drawings.

In these drawings.

2

Figure 5:
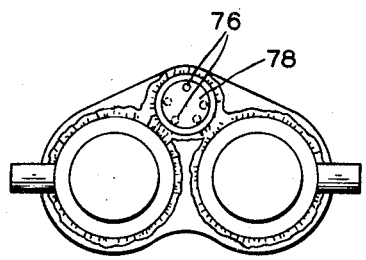
Figure 4:
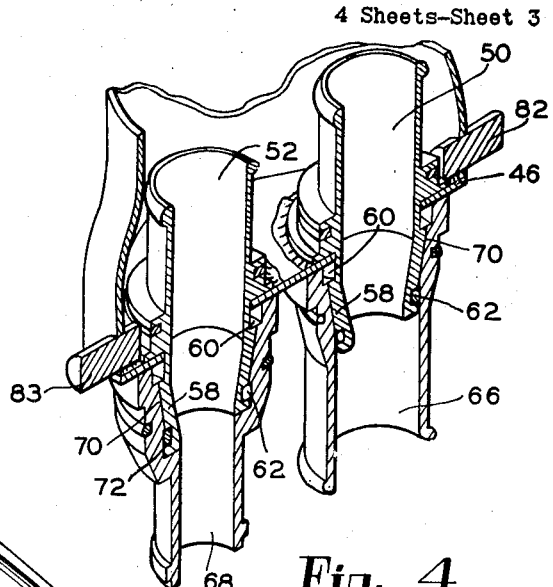
Figure 3:
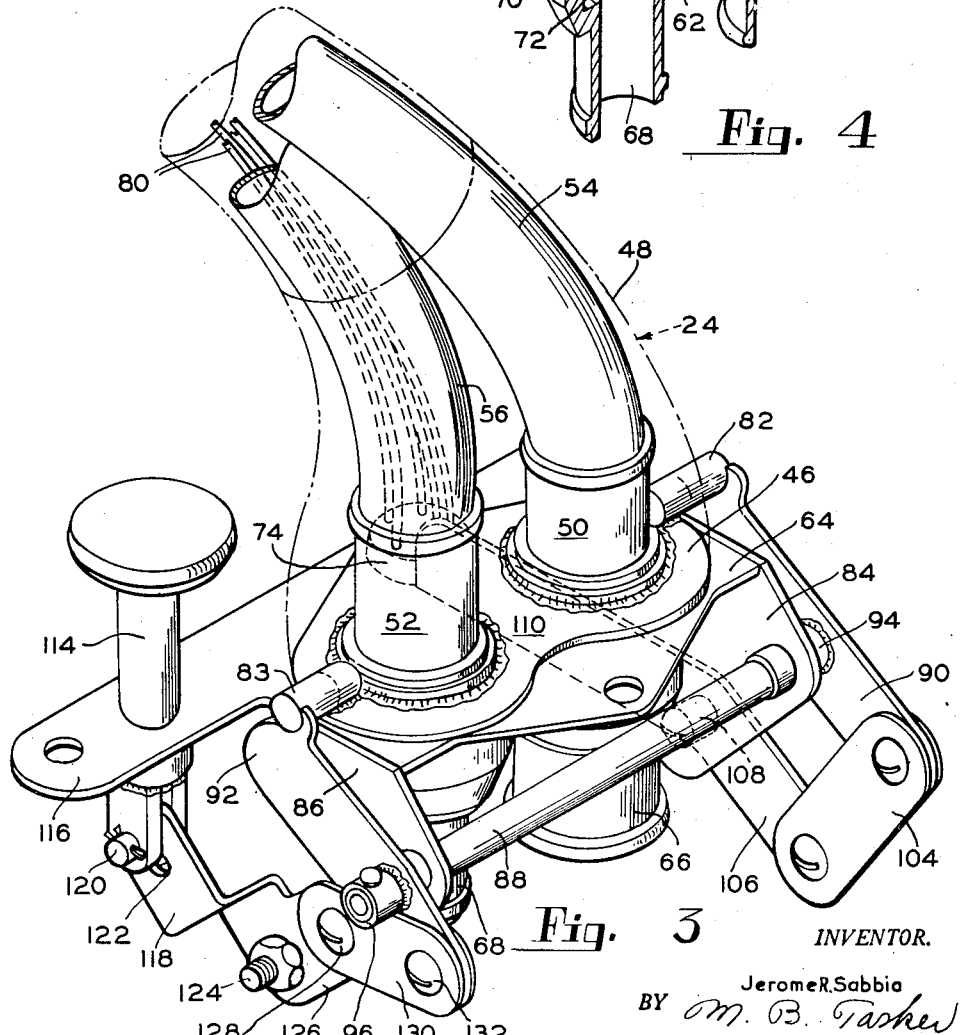
Fig. 3 is an enlarged detailed view in perspective of the airplane quick disconnect mechanism.

Fig. 4 is a vertical section through a part of the mechanism of Fig. 3;

Fig. 5 is a top plan view of Fig. 4;

Fig. 6 is an end view of the quick disconnect mechanism just following release of the adapter;

Fig. 7 is a side view of the mechanism of Fig. 6; and

Fig. 8 is a view similar to Fig. 6 showing the mechanism in a different position.

Figure 1:
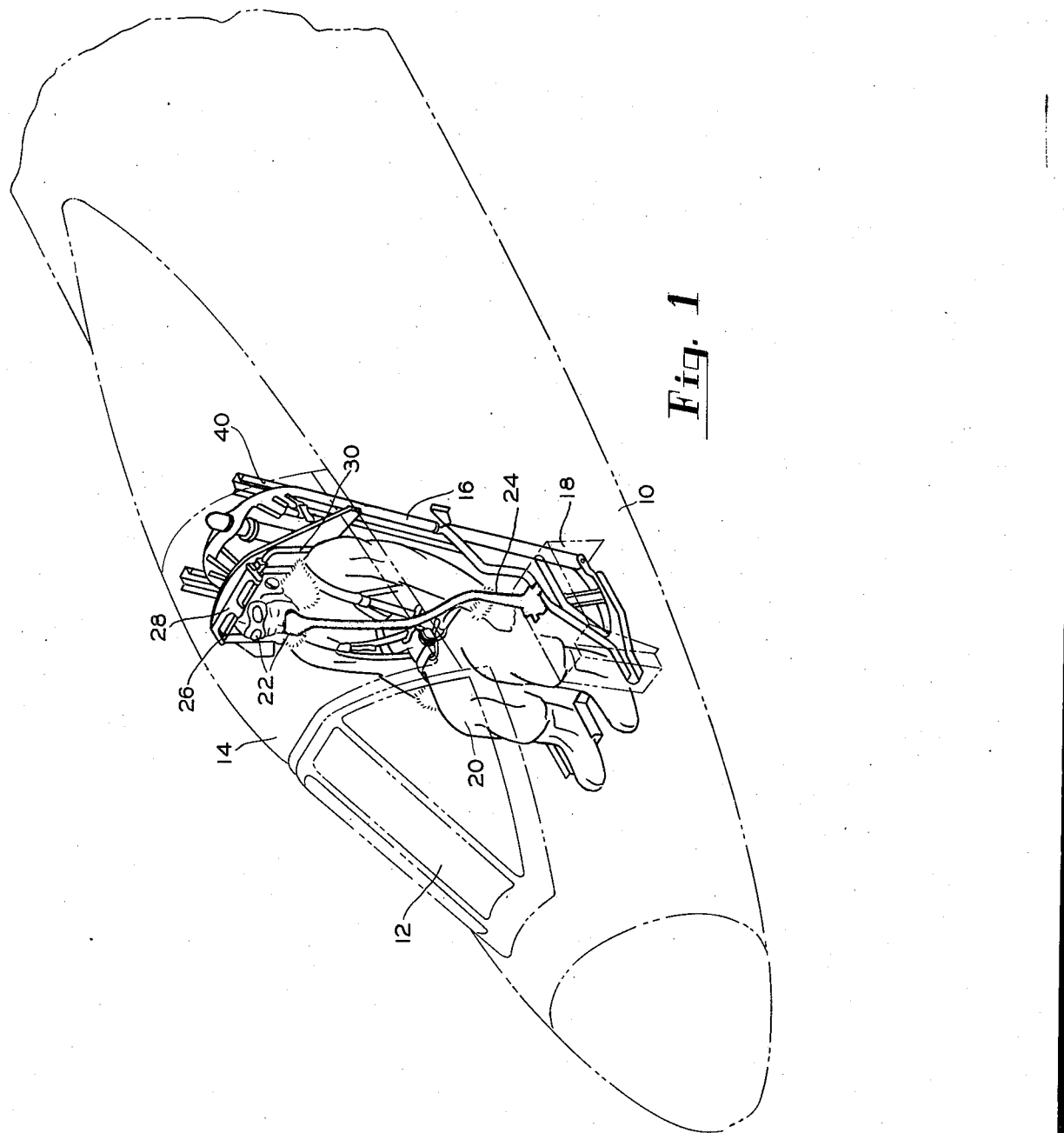
Fig. 1 shows the fixed equipment commonly worn by the pilot of a fighter airplane, parts of the airplane being shown in phantom lines.

Referring to Fig. 1, 10 indicates the fuselage of a fighter airplane having a pilot compartment 12 normally closed by a sliding canopy cover 14 and containing an ejectable pilot seat 16. A console 18 is located adjacent the pilot's seat and is fixed to the airplane structure, the equipment in this console being connected with the pilot's fixed equipment including his "G" suit 20 and mask 22 by a flexible adapter 24.

When the pilot finds it necessary to leave the airplane while the latter is in flight, he grasps the handles 26 on the free end of the roller curtain 28 and pulls the curtain down over his face. In the final movement of the curtain the pivoted bracket 30 on which the latter is mounted is swung about its pivot to operate linkage 32 releasing a detonating pin 34 which causes an explosive charge in the container 36 to be detonated. This charge acting on the plate 38 near the center of gravity of the pilot and seat combination causes the seat with the pilot therein to be forcibly ejected from the cockpit, suitable mechanism, not shown herein, being provided to insure that the canopy cover 14 is open before the pilot can thus eject himself from the cockpit. The seat is guided in its generally vertical direction of movement by suitable tracks 40 carried by fixed structure of the airplane.

Figure 2:
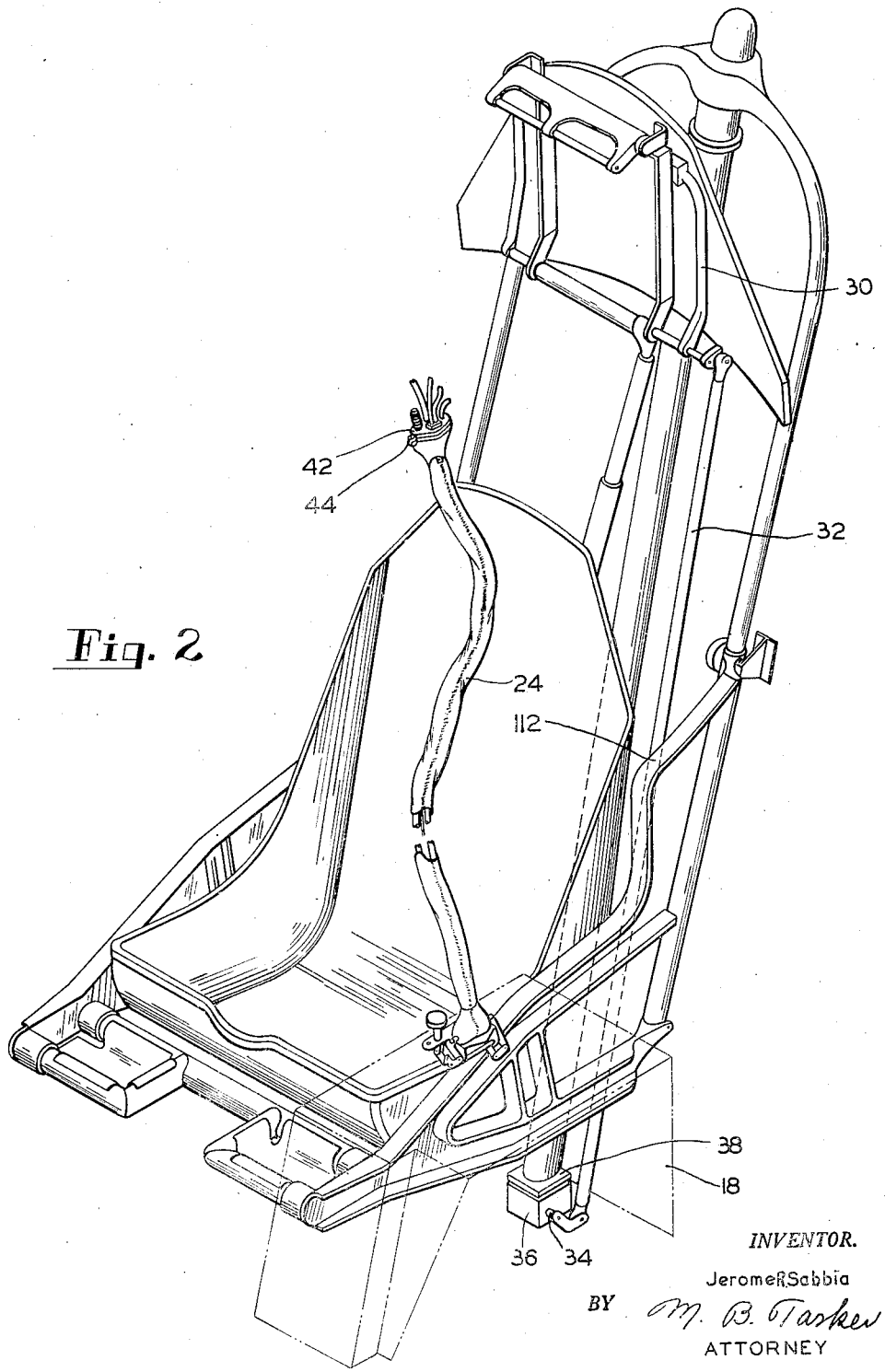
Fig. 2 is a perspective view on an enlarged scale of the pilot's seat, showing a flexible adapter for effecting the various connections between the airplane carried equipment and the pilot's fixed equipment including the quick disconnect mechanism at the lower end of the adapter.

It will be noted from Fig. 2 that the adapter 24 is connected at its upper end with the pilot's mask by means of an end fitting 42 in which the various connections of the tubes and electrical wires which extend through the adapter are carried into the pilot's mask and to his radio equipment. These connections can be quickly disconnected by pressing a button 44 when the pilot desires to leave the airplane in a normal manner when it is on the ground.

At its lower end, the adapter 24 carries a flat plate 46 (Fig. 3) to the outer periphery of which a neoprene sheath 48 is suitably secured. The plate 46 also carries two tubular fittings 50 and 52 to the upper ends of which the flexible pipes 54 and 56 are connected for conducting air to the "G" suit and oxygen to the mask, respectively. Fittings 50 and 52 are located in passages in plate 46 and are welded permanently to the plate and have externally tapered portions 58 which extend below the plate 46. The portions of these fittings which extend below the plate 46 are provided with external gasket receiving grooves 60 adjacent plate 46 and external grooves adjacent their lower ends in which snap rings 62 are carried. The console 18 has a cover plate 64 provided with spaced apertures in which two socket-like fittings 66 and 68 are welded beneath the cover and which are adapted to receive the fittings 50 and 52 therein. As will be evident from Fig. 4, the socket-like fittings 66 and 68 have internal tapered surfaces 70 which cooperate with tapered surfaces 58 of fittings 50 and 52 in centering the latter in the sockets 66 and 68. It will further be noted from Fig. 4 that as the external tapers 58 are seated in the tapers 70 and the gaskets 60 are compressed, the snap rings 62 pass off the tapers 70 into slightly enlarged recesses 72 in socket members 66 and 68 and thus releasably hold the complemental parts of these tubular disconnects together in fluid tight relationship, as shown in Fig. 4. At the same time that these disconnects move into seating relationship, a plurality of rigid jacks carried by an insulating block 74 are received in corresponding contacts 76 mounted in an insulating block 78 carried by plate 64, thus establishing the electrical connections for the leads 80 which extend through the adapter.

Means are provided for automatically disconnecting the jacks and the tubular disconnects in the initial movement of the seat as the latter is ejected from the cockpit. To this end the plate 46 which carries fittings 50 and 52 is provided with two oppositely laterally projecting pins 82 and 83 which are welded rigidly to the upper surfaces of the plate and project slightly therebeyond. The plate 64 has welded thereto a pair of depending side plates 84 and 86 in which a shaft 88 is journaled. The shaft 88 projects slightly beyond the plates 84 and 86 and has rigidly mounted on its opposite ends two cam levers 90 and 92, these levers having holes therein intermediate their ends through which the shaft 88 extends. Levers 90 and 92 are fixed to the shaft 88 by means of tubular collars 94 and 96 which are pinned to the shaft and are permanently welded to the levers. Each of said levers has a rounded cam shaped end 98 and an adjacent lip 100 which forms a circular depression 102 in which the pins 82 and 83 are adapted normally to rest in the connected position thereof shown in Figs. 3 and 4.

Cam lever 90 has its other end pivotally connected by means of a pair of parallel short links 104 with the short end of an actuating lever 106 which is pivoted intermediate its ends on a pivot 108 carried by plate 84. The long arm 110 of lever 106 extends laterally over a frame member 112 of the seat structure in position to be engaged by the latter as the seat is projected generally vertically out of the cockpit to rock the lever 106 in a counterclockwise direction as viewed in Fig. 6. This causes counterclockwise rotation of levers 90 and 92 and moves the cam portions 98 on these levers into their Fig. 8 position to positively lift the pins 82 and 83 sufficiently to move the snap rings 62 out of the groove 72 and break the connections of the quick disconnects.

This same releasing action of the disconnects can be accomplished manually by depressing a plunger 114 which is mounted in a projecting ear 116 of plate 64. Plunger 114 is bifurcated at its lower end to receive one end of a bell crank 118 which is pivoted thereto on a pin 120 received in a slot 122 of the bell crank arm. Bell crank 118 is pivoted at 124 on the side plate 86 and has its short arm 126 pivoted at 128 to one end of a pair of links 130, the other end of which is pivotally connected at 132 to the extremity of cam lever 92.

In operation, if the pilot finds it necessary to make an emergency exit from the airplane when the latter is in high speed flight, he grasps the handle 26 and pulls the curtain 28 over his face. In the final movement of the curtain the explosive charge beneath the seat is detonated, as previously explained, and the seat with the pilot sitting therein, guided by the tracks 40, is projected through the open top of the cockpit. In the initial movement of the seat from its normal position, shown in Fig. 1, the projecting end 110 of actuating lever 106 is struck by seat frame member 112 and is moved counterclockwise (Fig. 6) about its pivot 108 into the position shown in Fig. 8 in which the cams 98 of cam members 90 and 92 have been moved clockwise, as viewed in Fig. 3, to cam the pins 82 and 83 upwardly and move the fittings 50, 52 out of the sockets 66, 68 sufficiently to release the releasable connection therebetween and permit the seat carrying the pilot to move freely out of the cockpit.

It will be evident that as a result of this invention means have been provided for automatically disconnecting the various electrical and fluid connections which are normally required between the pilot's fixed equipment and the airplane by the initial movement of the pilot's seat from its normal position in the cockpit.

It will further be evident that means have been provided by which this disconnection can be effected manually by the pilot at will when he wishes to leave the airplane when the latter is on the ground.

It will further be evident that the means provided is particularly simple and reliable in operation and that it is positive in operation.

While only a single embodiment of the invention has been shown herein, it will be understood that various modifications in the construction and arrangement of the parts may be resorted to without departing from the scope of the invention as claimed herein.

I claim:

1. In an aircraft, an ejectable pilot's seat adapted to be projected from the pilot's compartment, pilot's equipment adapted to be worn by a pilot in said seat, means including fluid and electrical supply lines connecting said equipment with sources of supply carried by the aircraft including a flexible adapter, releasable disconnecting means in said supply lines including fittings, and mechanism carried by the aircraft adjacent said disconnecting means including a member operated in the initial movement of said seat as the latter is projected from the compartment for positively disconnecting said fittings.

2. In an aircraft, an ejectable pilot's seat adapted to be projected from the pilot's compartment, pilot's equipment adapted to be worn by a pilot in said seat, means including fluid and electrical supply lines connecting said equipment with sources of supply carried by the aircraft including a flexible adapter, releasable disconnecting means in said supply lines including telescoping stationary and movable fittings, said fittings having cooperating means for holding the same releasably in fluid tight relation, cam members pivotally mounted on adjacent fixed structure of the aircraft adapted to engage said movable fittings and move them positively out of engagement with said stationary fittings, and means actuated by the seat as the latter is projected from said compartment for actuating said cam means.

3. A quick disconnect for releasably connecting pilot's equipment with supply lines in an aircraft including stationary and movable members, cooperating surfaces on said members for centering the same when they are seated, resilient fluid tight packing means compressed between said members when said surfaces are seated, and resilient means on the centering surface of one of said members and engageable with an abutment on the centering surface of the other member for releasably holding said members with said surfaces in seated position.

4. A quick disconnect for releasably connecting pilot's equipment with fluid and electric supply lines in an aircraft including stationary and movable telescoping tubular members, cooperating surfaces on said members for centering the same when they are seated, resilient fluid tight packing means compressed between said members when said surfaces are seated, and resilient means on the centering surface of one of said members and engageable with an abutment on the cooperating centering surface of the other member for releasably holding said members with said surfaces in seated position.

5. Quick disconnect mechanism for releasably connecting piliot's equipment with fluid supply lines in an aircraft including stationary and movable telescoping members having cooperating tapered surfaces, means for effecting a releasable fluid tight connection therebetween including resilient snap connecting means on said surfaces, stationary and movable cam elements carried by said stationary and movable members, and an actuating member for actuating said movable cam element to release said connecting means.

6. Quick disconnect mechanism for releasably connecting a pilot's equipment with fluid supply lines in an aircraft including a plate member carried by the aircraft having passages therein, a movable plate having aligned passages therein, tubular fittings carried by said plates in said passages, the aligned fittings in said plates having adjacent telescoping ends, cam follower elements on said movable plate projecting from opposite sides thereof, a pair of pivoted cam elements mounted on said stationary plate in position to engage said projecting follower elements, and means for rotating said cam elements in unison to effect disconnection of said telescoping fittings.

JEROME R. SABBIA.

REFERENCES CITED

The following references are of record in the file of this patent:

UNITED STATES PATENTS

| Number | Name | Date |
|---|---|---|
| 293,453 | Hamer | Feb. 12, 1884 |
| 2,197,299 | Fleet | Apr. 16, 1940 |
| 2,329,289 | Morehouse | Sept. 14, 1943 |
| 2,331,309 | Curriston | Oct. 12, 1943 |
| 2,335,822 | Bowers | Nov. 30, 1943 |
| 2,459,948 | Lobelle | Jan. 25, 1949 |
| 2,467,763 | Martin | Apr. 19, 1949 |

FOREIGN PATENTS

| Number | Country | Date |
|---|---|---|
| 501,203 | Great Britain | Feb. 20, 1939 |
| 501,236 | Great Britain | Feb. 20, 1939 |